(12) United States Patent
Hotelling et al.

(10) Patent No.: US 8,723,830 B2
(45) Date of Patent: *May 13, 2014

(54) TOUCH PAD ELECTRODE DESIGN

(71) Applicant: Apple Inc., Cupertino, CA (US)

(72) Inventors: Steve Porter Hotelling, Los Gatos, CA (US); Kenneth Lawrence Staton, San Marcos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,654

(22) Filed: Jan. 18, 2013

(65) Prior Publication Data

US 2013/0127781 A1      May 23, 2013

Related U.S. Application Data

(63) Continuation of application No. 11/963,716, filed on Dec. 21, 2007, now Pat. No. 8,358,276.

(51) Int. Cl.
*G09G 5/00* (2006.01)
*G06F 3/043* (2006.01)

(52) U.S. Cl.
USPC .......................................... 345/173

(58) Field of Classification Search
USPC ................................. 345/156, 173
See application file for complete search history.

(56) References Cited

U.S. PATENT DOCUMENTS

| | | |
|---|---|---|
| 5,379,057 A | 1/1995 | Clough et al. |
| 5,483,261 A | 1/1996 | Yasutake |
| 5,488,204 A | 1/1996 | Mead et al. |
| 5,543,589 A * | 8/1996 | Buchana et al. ........... 178/18.03 |
| 5,675,362 A | 10/1997 | Clough et al. |
| 5,825,352 A | 10/1998 | Bisset et al. |
| 5,835,079 A | 11/1998 | Shieh |
| 5,880,411 A | 3/1999 | Gillespie et al. |
| 5,933,102 A | 8/1999 | Miller et al. |
| 6,147,680 A | 11/2000 | Tareev |
| 6,188,391 B1 | 2/2001 | Seely et al. |
| 6,310,610 B1 | 10/2001 | Beaton et al. |

(Continued)

FOREIGN PATENT DOCUMENTS

| | | |
|---|---|---|
| EP | 1 645 951 A | 4/2006 |
| JP | 2000-163031 A | 6/2000 |
| JP | 2002-342033 A | 11/2002 |
| WO | WO-2009/085775 A2 | 7/2009 |

OTHER PUBLICATIONS

Anonymous. (Oct. 10, 2002). "QMatrix™ Panel Design Guidelines," Quantum Research Application Note AN-KD01, *QRG Ltd.*, four pages.

(Continued)

*Primary Examiner* — Amr Awad
*Assistant Examiner* — Randal Willis
(74) *Attorney, Agent, or Firm* — Morrison & Foerster LLP

(57) ABSTRACT

A multi-touch capacitive touch sensor panel can be created using a substrate with column and row traces formed on separate layers of the substrate. The column and row traces can include sections extending from a central trace and forming a rectilinear trace pattern with sections of the columns and rows interdigitated with one another. The trace pattern can comprise a plurality of pixels arranged continuously across the sensor panel. In this manner, the sensor panel can provide a linear or near linear response to touches across the touch sensor panel.

22 Claims, 9 Drawing Sheets

(56) References Cited

U.S. PATENT DOCUMENTS

| | | | |
|---|---|---|---|
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,030,860 | B1 | 4/2006 | Hsu et al. |
| 7,184,064 | B2 | 2/2007 | Zimmerman et al. |
| 7,663,607 | B2 | 2/2010 | Hotelling et al. |
| 8,358,276 | B2 * | 1/2013 | Hotelling et al. ............. 345/173 |
| 8,479,122 | B2 | 7/2013 | Hotelling et al. |
| 2004/0239650 | A1 | 12/2004 | Mackey |
| 2005/0270273 | A1 | 12/2005 | Marten |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2008/0074398 | A1 | 3/2008 | Wright |
| 2009/0159344 | A1 | 6/2009 | Hotelling et al. |

OTHER PUBLICATIONS

Final Office Action mailed May 23, 2011, for U.S. Appl. No. 11/963,716, filed Dec. 21, 2007, 12 pages.

International Search Report mailed Oct. 15, 2009, for PCT Application No. PCT/US2008/087037, filed Dec. 16, 2008, four pages.

Lee, S.K. et al. (Apr. 1985). "A-Multi-Touch Three Dimensional Touch-Sensitive Tablet," *Proceedings of CHI: ACM Conference on Human Factors in Computing Systems*, pp. 21-25.

Non-Final Office Action mailed Feb. 4, 2011, for U.S. Appl. No. 11/963,716, filed Dec. 21, 2007, 13 pages.

Non-Final Office Action mailed Dec. 20, 2011, for U.S. Appl. No. 11/963,716, filed Dec. 21, 2007, 16 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Taiwan Search Report completed Nov. 26, 2012, for TW Patent Application No. 097149414, one page.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

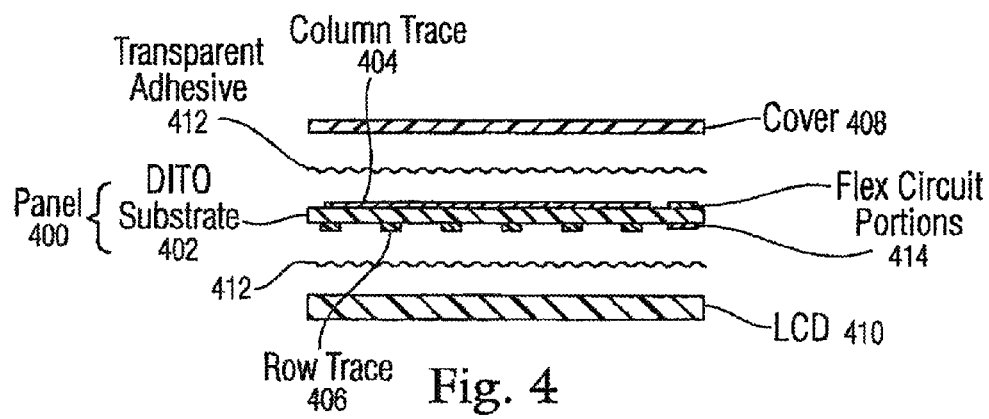
Fig. 4
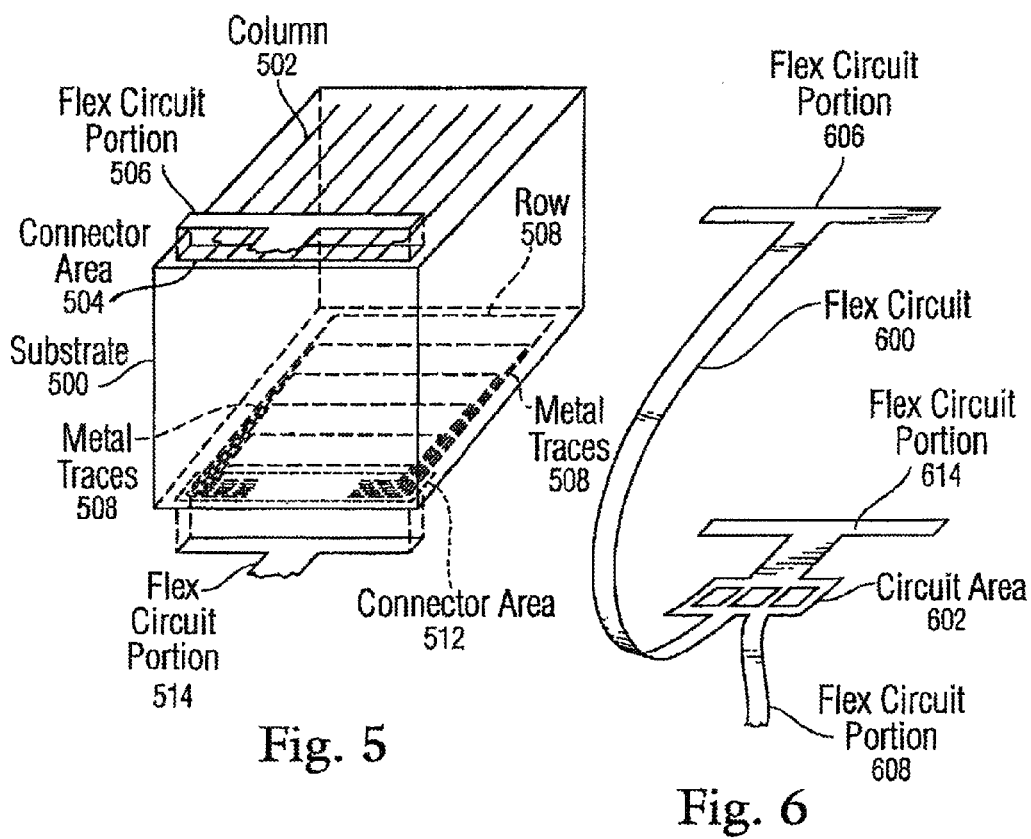
Fig. 5
Fig. 6

TOUCH PAD ELECTRODE DESIGN

FIELD OF THE INVENTION

This invention relates to touch sensor panels, and more particularly, to capacitive multi-touch sensor panels having rows and columns forming a rectilinear pattern.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Some touch panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Capacitive touch sensor panels can be formed from rows and columns of traces on opposite sides of a dielectric. At the "intersections" of the traces, where the traces pass above and below each other (but do not make direct electrical contact with each other), the traces essentially form two electrodes. Conventional touch panels for use over display devices have typically utilized a top layer of glass upon which transparent column traces of indium tin oxide (ITO) or antimony tin oxide (ATO) have been etched, and a bottom layer of glass upon which row traces of ITO have been etched. However, the use of transparent traces is not required if the conductors are thin enough (on the order of 30 microns). In addition, if panel transparency is not required (e.g. the touch panel is not being used over a display device), the conductors can be made out of an opaque material such as copper. The top and bottom glass layers are separated by a clear polymer spacer that acts as a dielectric between the row and column traces.

To scan a sensor panel, a stimulus can be applied to one row with all other rows held at DC voltage levels. When a row is stimulated, a modulated output signal can be capacitively coupled onto the columns of the sensor panel. The columns can be connected to analog channels (also referred to herein as event detection and demodulation circuits). For every row that is stimulated, each analog channel connected to a column generates an output value representative of an amount of change in the modulated output signal due to a touch or hover event occurring at the sensor located at the intersection of the stimulated row and the connected column. After analog channel output values are obtained for every column in the sensor panel, a new row is stimulated (with all other rows once again held at DC voltage levels), and additional analog channel output values are obtained. When all rows have been stimulated and analog channel output values have been obtained, the sensor panel is said to have been "scanned," and a complete "image" of touch or hover can be obtained over the entire sensor panel. This image of touch or hover can include an analog channel output value for every pixel (row and column) in the panel, each output value representative of the amount of touch or hover that was detected at that particular location.

Some conventional capacitance touch pad sensors, however, have exhibited a more than optimal amount of noise and thermal drift. Furthermore, some conventional touch pad sensors have not provided a linear to substantially linear response as a finger, for example, moved across the surface of the touch sensitive panel. Therefore, it is an object of some embodiments to reduce the effects of any noise and thermal drift, as well as provide a linear or substantially linear response per area touched on the touch sensitive surface.

SUMMARY OF THE INVENTION

In accordance with some embodiments, a multi-touch sensor panel can be created having a substrate formed from a dielectric material. A first plurality of traces of conductive material can be located on a first layer of the substrate. Each of the plurality of first traces can comprise a first central trace arranged along a first dimension of a two-dimensional coordinate system and a plurality of first trace branches extending perpendicularly from the first central trace in a second dimension of the two-dimensional coordinate system. In addition, a second plurality of traces of the conductive material can be located on a second layer of the substrate. Each of the second plurality of traces can comprise a second central trace arranged along the second dimension and a plurality of second trace branches extending from the second central trace, and where at least some of the plurality of second trace branches can comprise a first extension branch extending perpendicularly along the first dimension from one of the second central traces and at least one second extension branch extending perpendicularly along the second dimension from the first extension branch. In some embodiments, at least some of the extension drive traces can further include one or more second sections extending perpendicularly from the first section. The driving traces can form an interdigitated pattern across a touch sensitive portion of the sensor panel.

In accordance with further embodiments, a capacitive touch sensor panel can be created having a plurality of rectangular-shaped pixels arranged across a touch sensor panel. Each pixel can comprise a sensing trace having a central sensing trace arranged along a first dimension of a two-coordinate system and a plurality of sensing braches extending perpendicularly from the central sensing trace. Each pixel can further include a driving trace having a central driving trace arranged along a second dimension of a two-coordinate system and a plurality of driving braches extending from the central driving trace. In some embodiments, at least some of the driving branches include a first section extending perpendicularly from the central driving trace and one or more second sections extending perpendicularly from the first section. The sensing branches and the second sections of the driving branches can be interdigitated with one another.

BRIEF DESCRIPTION OF THE DRAWINGS

FIG. 4 illustrates an exemplary capacitive touch sensor panel fabricated using a double-sided ITO (DITO) substrate having column and row ITO traces formed on either side of the substrate, and bonded between a cover and an LCD using transparent adhesive according to some embodiments of this invention.

FIG. 5 is an exploded perspective view of an exemplary DITO substrate (with its thickness greatly exaggerated for purposes of illustration only) with columns and rows formed on either side according to some embodiments of this invention.

FIG. 6 illustrates an exemplary flex circuit according to some embodiments of this invention, including flex circuit portions for connecting to the row and column traces, respectively, on either side of a DITO substrate, and a flex circuit portion for connecting to a host processor.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
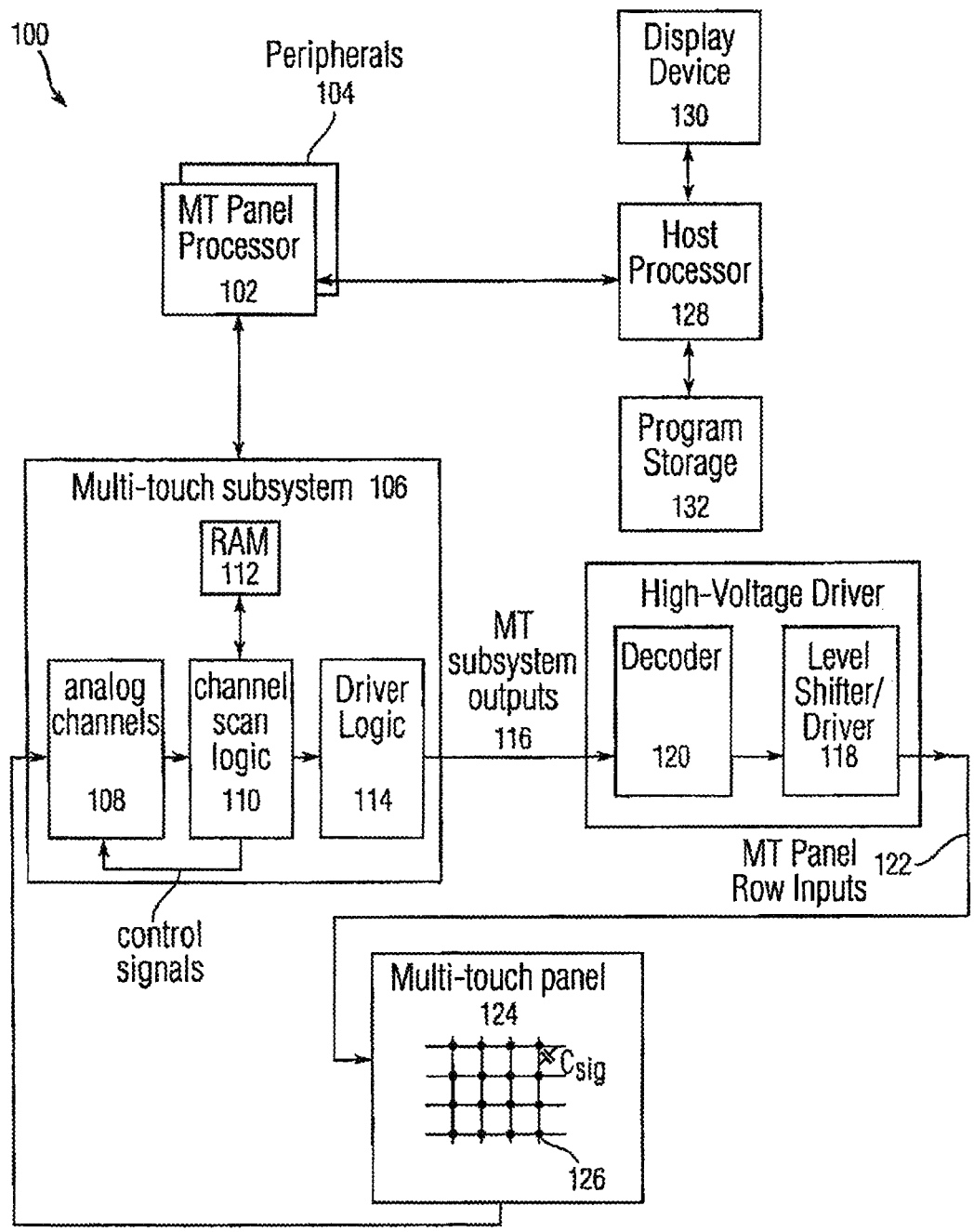
FIG. 1 illustrates an exemplary computing system operable with a capacitive multi-touch sensor panel according to some embodiments of this invention.

Multi-touch sensor panels and their associated sensor panel circuitry may be able to detect multiple touches (touch events or contact points) that occur at about the same time, and identify and track their locations. FIG. 1 illustrates exemplary computing system 100 operable with capacitive multi-touch sensor panel 124 according to embodiments of this invention. Multi-touch sensor panel 124 can be created using a substrate with column and row traces formed on either side of the substrate using a novel fabrication process. Flex circuits can be used to connect the column and row traces on either side of the sensor panel to its associated sensor panel circuitry. Traces made of copper or other highly conductive metals running along the edge of the substrate can be used to bring the row traces to the same edge of the substrate as the column traces so that the flex circuits can be bonded to the same edge of the substrate on directly opposing sides of the substrate, minimizing the area needed for connectivity and reducing the overall size of the sensor panel. A single flex circuit can be fabricated to connect to the rows and columns on directly opposing sides at the same edge of the substrate. Furthermore, the row traces can be widened to shield the column traces from a modulated Vcom layer.

Computing system 100 can include one or more panel processors 102 and peripherals 104, and panel subsystem 106. The one or more processors 102 can include, for example, an ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 to analog channels 108. In addition, channel scan logic 110 can control the driver logic and stimulation signals being selectively applied to rows of multi-touch panel 124. In some embodiments, panel subsystem 106, panel processor 102 and peripherals 104 can be integrated into a single application specific integrated circuit (ASIC).

Driver logic 114 can provide multiple panel subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and panel 124. Each panel row input 122 can drive one or more rows in panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a UI to a user of the device.

As mentioned above, multi-touch panel 124 can in some embodiments include a capacitive sensing medium having a plurality of row traces or driving lines and a plurality of column traces or sensing lines (although other sensing media may also be used) separated by a dielectric. In some embodiments, the dielectric material can be transparent, such as glass, or can be formed from other materials such as Mylar. The row and column traces can be formed from a transparent conductive medium such as ITO or ATO, although other transparent or non-transparent materials such as copper can also be used. In some embodiments, the row and column traces can be perpendicular to each other, although in other embodiments other non-orthogonal and non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as may be used herein are intended to encompass not only orthogonal grids, but the intersecting traces of other geometric configurations having first and second dimensions (e.g. the concentric and radial lines of a polar-coordinate arrangement).

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Figure 2A:
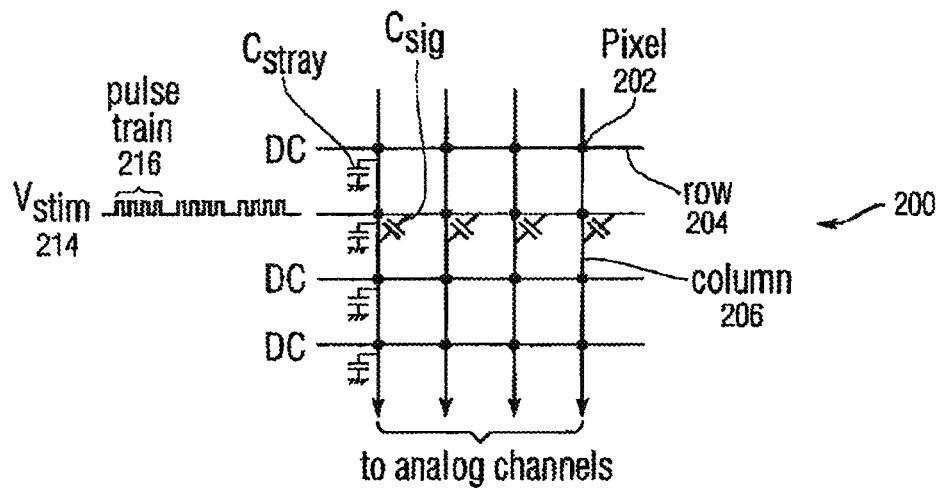
FIG. 2a illustrates an exemplary capacitive multi-touch panel according to some embodiments of this invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
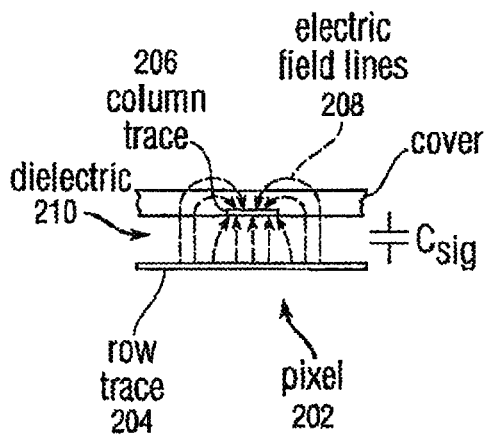
FIG. 2b is a side view of exemplary pixel in a steady-state (no-touch) condition according to some embodiments of this invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
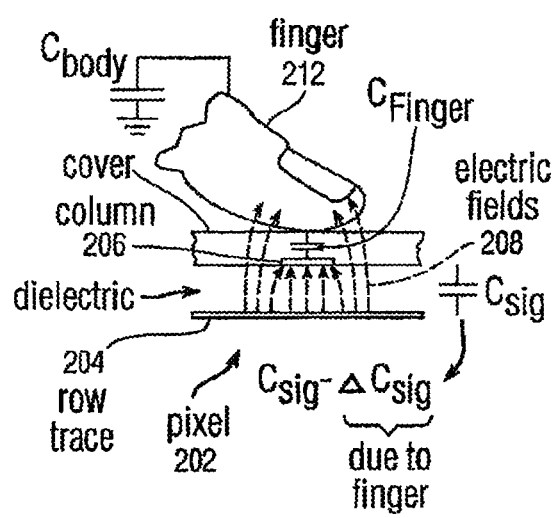
FIG. 2c is a side view of exemplary pixel in a dynamic (touch) condition according to some embodiments of this invention.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig-ΔCsig, where Csig represents the static (no touch) component and ΔCsig represents the dynamic (touch) component. Note that Csig-ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can be generated as one or more pulse trains 216 at a particular frequency, with each pulse train including a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel can be divided into two or more sections, with Vstim signal 214 being simultaneously applied to one row in each section and all other rows in that region section held at a DC voltage.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

As described above, because the rows may be either stimulated with an AC signal or held at a DC voltage level, and because the columns need to be connected to analog channels so that modulated output signals can be detected, demodulated and converted to output values, electrical connections must be formed with the rows and columns on either side of the dielectric of the sensor panel.

Figure 3:
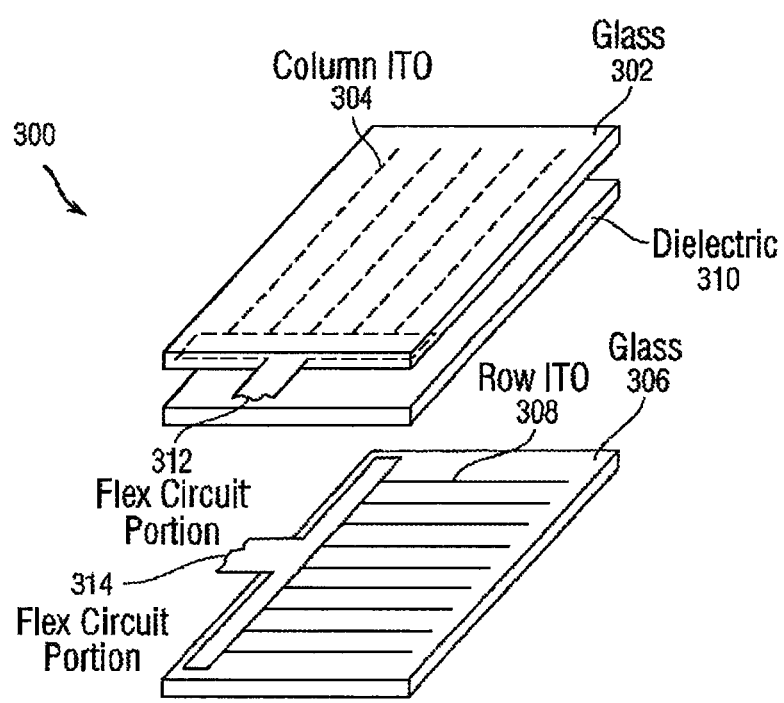
FIG. 3 is an exploded perspective view of an exemplary capacitive touch sensor panel formed from a top layer of glass upon which transparent column traces of ITO have been etched, and a bottom layer of glass upon which row traces of ITO have been etched.

FIG. 3 is an exploded perspective view of an exemplary capacitive touch sensor panel 300 formed from a top layer of glass 302 upon which transparent column traces of ITO 304 have been etched, and a bottom layer of glass 306 upon which row traces of ITO 308 have been etched. The top and bottom glass layers 302 and 306 are separated by a clear polymer spacer 310 that acts as a dielectric between the row and column traces. Because the rows and columns are perpendicular to each other, the most straightforward way to connect to these rows and columns is to bond flex circuit 312 at one edge of the sensor panel, and bond another flex circuit 314 on an adjacent edge of the sensor panel. However, because the connection areas for these flex circuits 312 and 314 are not on the same edge of sensor panel 300 and are not on directly opposing sides of dielectric 310, the sensor panel must be made larger to accommodate these two non-overlapping connection areas.

Capacitive touch sensor panels typically form the row and column traces on two pieces of glass as shown in FIG. 3 because it has not been practical to form column and row traces on either side of a single substrate. Conventional methods for forming ITO traces on one side of a substrate require that the substrate be placed on rollers during the fabrication process. However, if the substrate is then flipped over to form ITO traces on the second side, the rollers will damage any traces previously formed on the first side of the substrate. Furthermore, when etching is used to etch away part of the ITO to form traces on one side of the substrate, the entire substrate is conventionally placed in an etching bath, which will etch away any traces previously formed on the other side of the substrate.

FIG. 4 illustrates an exemplary capacitive touch sensor panel 400 fabricated using a double-sided ITO (DITO) substrate 402 having column and row ITO traces 404 and 406, respectively, formed on either side of the substrate, and bonded between cover 408 and LCD 410 using transparent adhesive 412 according to embodiments of this invention. Substrate 402 can be formed from glass, plastic, hybrid glass/plastic materials, and the like. Cover 408 can be formed from glass, acrylic, sapphire, and the like. To connect to column and row traces 404 and 406, respectively, two flex circuit portions 414 can be bonded to directly opposing sides at the same edge of DITO 402, although other bonding locations may also be employed.

FIG. 5 is an exploded perspective view of an exemplary DITO substrate 500 (with its thickness greatly exaggerated for purposes of illustration only) with columns 502 and rows 508 formed on either side according to embodiments of this invention. Some of column ITO traces 502 on the top side are routed to a necked-down connector area 504, where they are brought off the panel by a flex circuit portion 506 that can be conductively bonded to the top of DITO substrate 500. In some embodiments, row ITO traces 508 on the bottom side can be connected to thin metal traces 510 that run alongside the edges of the bottom side. Metal traces 510 can be routed to connector area 512, which can be directly opposing connector area 504, or at least on the same edge of DITO substrate 500 as connector area 504. Providing connector areas 504 and 512 at the same edge of DITO substrate 500 can allow the substrate and therefore the product to be smaller. Another flex circuit portion 514 can be used to bring row ITO traces 508 off the panel.

Column and row ITO traces 502 and 508 can be formed on both sides of DITO substrate 500 using several fabrication methods. In one embodiment, a substrate can be placed on the rollers of the fabrication machinery and a layer of ITO can be sputtered onto a first side of DITO substrate 500 and etched (e.g. using photolithography techniques) to form column traces 502. A protective coating of photoresist (e.g. two layers of photoresist) can then be applied over the column traces 502, and DITO substrate 500 can be flipped over so that the rollers make contact only with the applied photoresist on the first side and not the formed column traces. Another layer of ITO can then be sputtered onto the now-exposed back side of DITO substrate 500 and etched to form row traces 508.

If no metal traces 510 are required, the photoresist on the first side can be stripped off to complete the process. However, if metal traces 510 are required at the edges to connect to row traces 508 and bring them to a particular edge of the substrate, a protective coating of photoresist (e.g. two layers of photoresist) can be applied over row traces 508, leaving the edges exposed. A metal layer can then be sputtered over the photoresist and exposed edges, and the metal layer can then be etched to form metal traces 510 at the edges. Finally, all remaining layers of photoresist can be stripped off.

Minor variations to the process described above can also be made. For example, the second side of the DITO substrate patterning may be formed by first patterning a photoresist using very simple geometry to cover only the interior region of the second side of the DITO substrate while leaving the edge regions exposed. For this variation, metal is sputtered first and then the photoresist with simple geometry is then stripped off to leave metal in the edge regions only. Then the ITO is sputtered over the entire second side of the DITO substrate. A second photoresist is applied and patterned to form the mask for the electrode patterns. A series of etching steps is then used to form the electrode pattern in the topmost ITO layer and metal layer underneath. The first etching steps etches the ITO only, and the second etch steps etches the metal layer only which produces the desired electrode geometry.

FIG. 6 illustrates an exemplary flex circuit 600 according to embodiments of this invention, including flex circuit portions 606 and 614 for connecting to the row and column traces, respectively, on either side of a DITO substrate, and flex circuit portion 608 for connecting to a host processor. Flex circuit 600 includes a circuit area 602 upon which the multi-touch subsystem, multi-touch panel processor, the high voltage driver and decoder circuitry (see FIG. 1), an EEPROM and some essential small components such as bypass capacitors can be mounted and connected to save space. Circuit area 602 may be shielded by an EMI can (not shown) which encloses circuit area 602 using top and bottom shield portions. The bottom can may be adhered to a structure of the device to secure the circuit area. From this circuit area 602, flex circuit 600 may connect to the top of the DITO substrate via flex circuit portion 606, to the bottom of the DITO substrate via flex circuit portion 614, and to a host processor via flex circuit portion 608.

Figure 7:
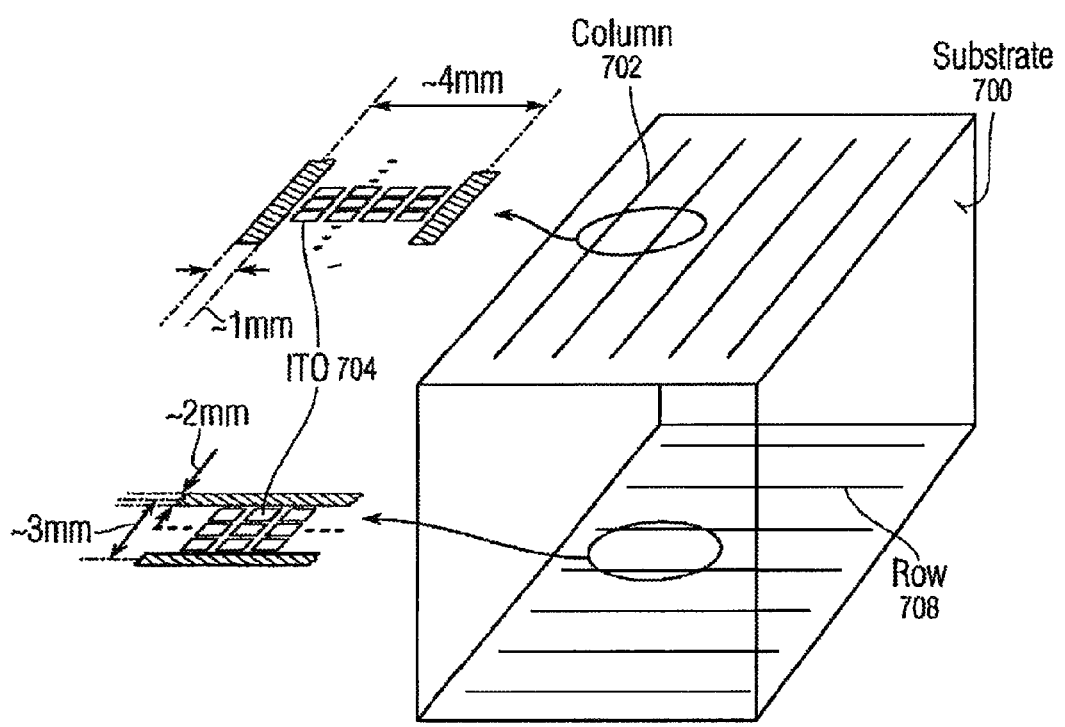
FIG. 7 is an exploded perspective view of an exemplary DITO substrate (with its thickness greatly exaggerated for purposes of illustration only) with columns and rows formed on either side, and small isolated squares between the columns and rows to provide a uniform appearance.

FIG. 7 is an exploded perspective view of an exemplary DITO substrate 700 (with its thickness greatly exaggerated for purposes of illustration only) with columns 702 and rows 708 formed on either side. As shown in FIG. 7, column traces 702 can be about 1 mm wide, with a spacing of about 4 mm between the traces, and row traces 708 can be about 2 mm wide, with a spacing of about 3 mm between the rows. To create a more uniform appearance, small isolated squares of ITO 704 can be formed between the column and row traces 702 and 708 on either side of DITO substrate 700, with narrow spacing (e.g. about 30 microns) between the isolated squares of ITO, so that either side of the DITO substrate provides a uniform appearance similar to a solid sheet of ITO.

Figure 8:
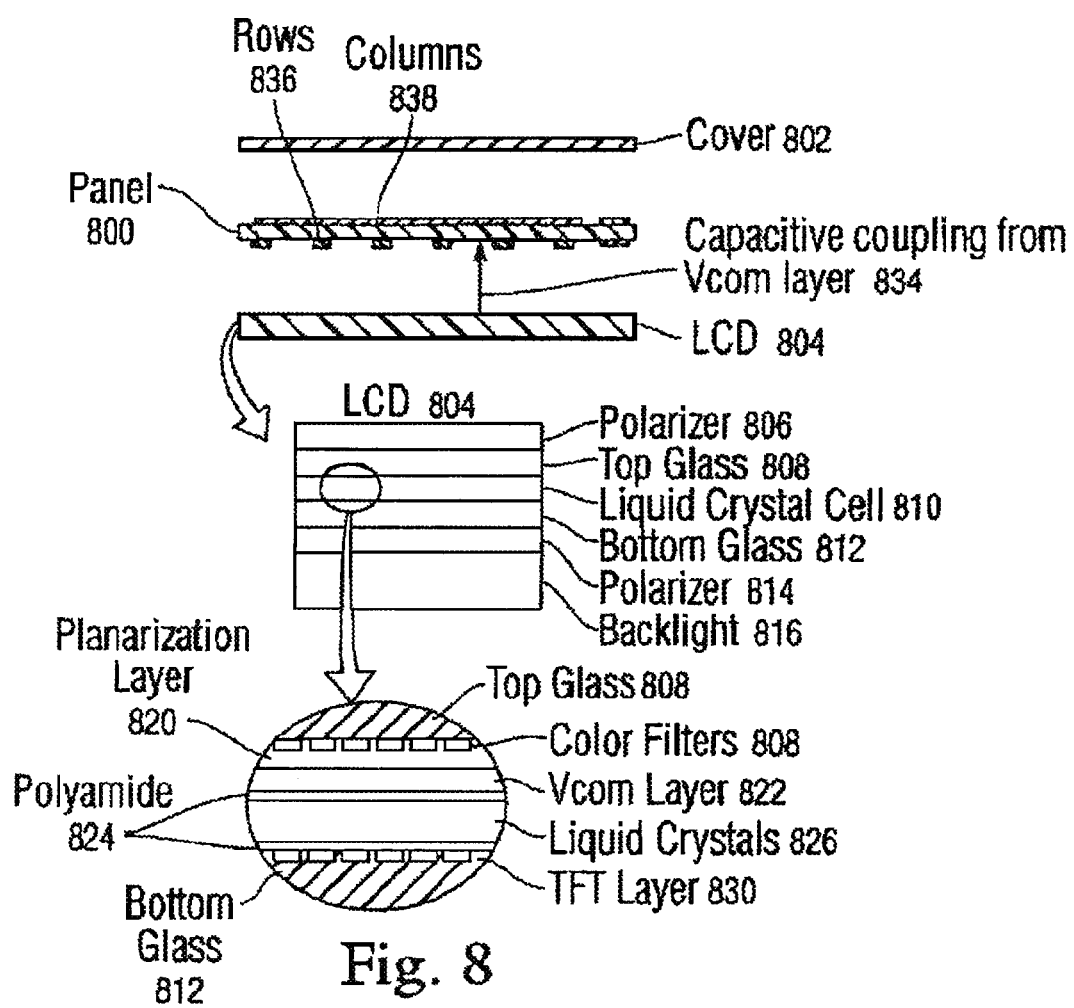
FIG. 8 illustrates a stackup of an exemplary double-sided touch panel along with a cover and liquid crystal display (LCD) according to some embodiments.

FIG. 8 illustrates a stackup of an exemplary double-sided touch panel 800 along with cover 802 and liquid crystal display (LCD) 804 according to embodiments of this invention. From top to bottom, LCD 804 can include polarizer 806, top glass layer 808, liquid crystal layer 810, bottom glass layer 812, polarizer 814, and backlight 816.

From top to bottom, liquid crystal layer 810 can include RGB color filter layer 818, planarization layer 820, a conductive unpatterned layer of ITO referred to as Vcom layer 822, polyamide layer 824, liquid crystal layer 826, and polyamide layer 828. Beneath polyamide layer 828 is a layer of ITO rectangles and TFTs (collectively referred to herein as TFT layer 830), with one ITO rectangle and TFT for each sub-pixel (where three sub-pixels comprise a pixel).

Color filter layer 818 provides the three RGB colors that make up each pixel when illuminated by light, wherein the ratio of colors determines the color of that pixel. Planarization layer 820 can be formed from clear plastic to smooth out the surface of color filter layer 818. Vcom stands for "Voltage common" because Vcom layer 822 provides a common voltage for the ITO subpixels of TFT layer 830. Vcom layer 822 may be maintained at a constant voltage (LCDs using a constant Vcom voltage may be referred to as DC or constant Vcom LCDs) or modulated with an AC signal. Polyamide layers 824 and 828 serve to pre-align the orientation of liquid crystals in liquid crystal layer 826. To create the color for one pixel, the ITO squares for each subpixel in TFT layer 830 can have voltages applied to them with respect to Vcom layer 822, which causes the liquid crystals to align and allow light from backlight 816 to pass through liquid crystal layer 826 and through the RGB color filters in color filter layer 818.

As mentioned above, although Vcom layer 822 can be held constant, in some embodiments the Vcom layer can be driven by a modulated signal (e.g. a squareware from about 1 to 4 volts). However, when Vcom layer 822 is driven by a modulated signal, the modulated signal may be capacitively coupled (see reference character 834) through the sparse conductors of rows 836 on the bottom of double-sided touch panel 800 and onto columns 838, causing noise on the columns. Note that rows 836 are referred to as "sparse," even though it includes many closely spaced ITO squares, because the squares are isolated and therefore of negligible effect from a shielding standpoint. Note also that although modulated Vcom layer 822 is also capacitively coupled onto rows 836, because the rows are being driven by driver circuitry with low impedance outputs, any capacitive coupling is shunted to the driver outputs, and has negligible effect. However, columns 838 are designed to sense small changes in the AC capacitance of the touch panel, so the capacitive coupling from modulated Vcom layer 822 can easily be seen as noise at the analog channels receiving the columns.

Figure 9:
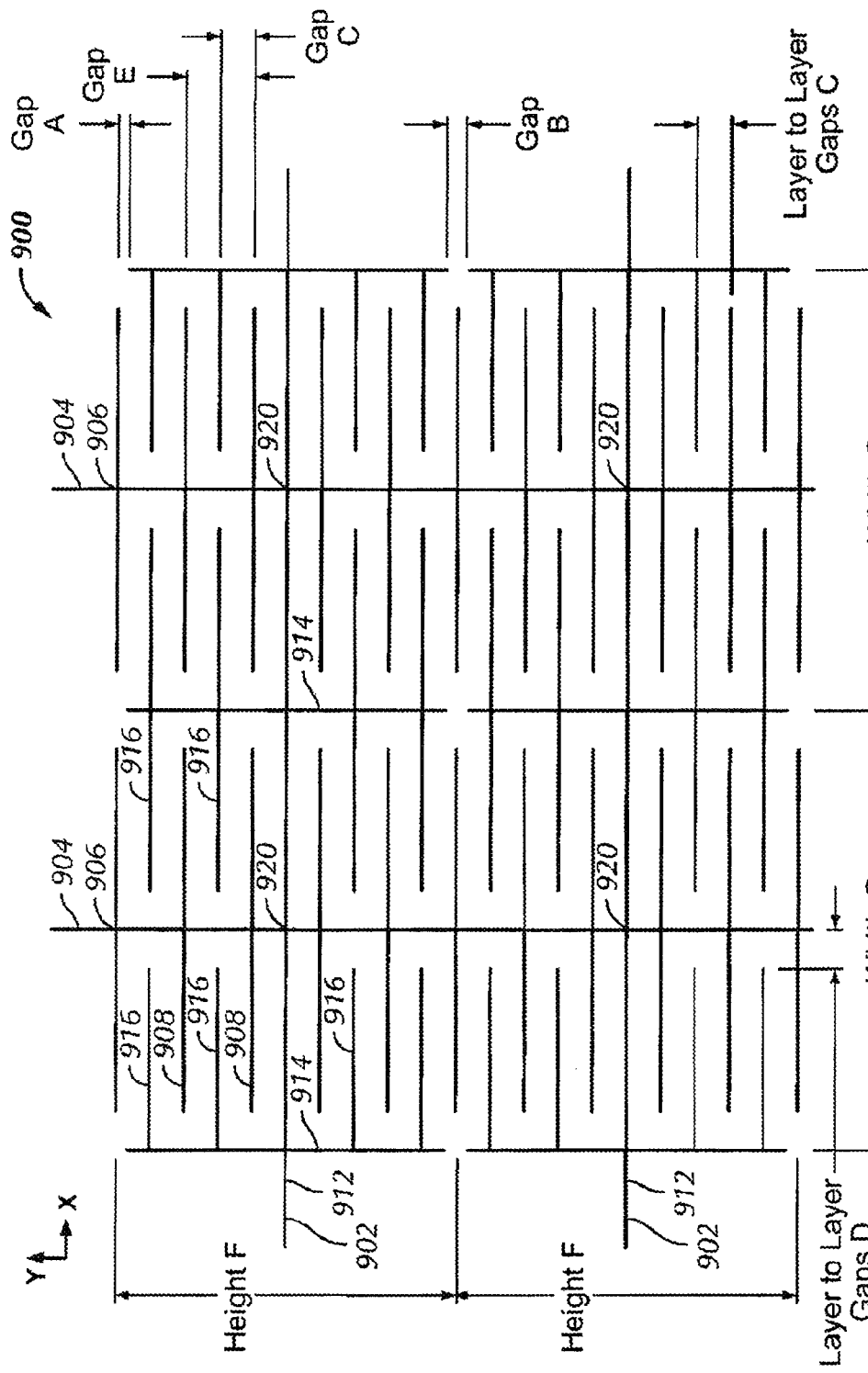
FIG. 9 is top view of a rectilinear electrode pattern in accordance with some embodiments.

FIG. 9 is a top view of rectilinear electrode pattern 900 in accordance with some embodiments of the present invention. Similar to embodiment illustrated in FIG. 3, rectilinear pattern 900 can include a plurality of row traces 902 and column traces 904. In contrast to the embodiment in FIG. 3, however, rectilinear electrode pattern 900 can include additional trace sections extending perpendicularly from rows 902 and columns 904, as described below.

Further to FIG. 9, each column trace 904 can include a central column trace 906, which can extend vertically in the y-axis, and plurality of column extension traces 908, each column extension trace 908 extending perpendicularly in the x-axis from both sides of central column trace 906. In this manner, each column trace 904 can be described as having a ladder-like pattern. Each row trace 902 can include a central row trace 912, which can extend horizontally in the x-axis, and a plurality of first extension row traces 914, each first row extension trace extending perpendicularly in the y-axis from both sides of one of the plurality of central row traces 912. Each row trace 902 can additionally include a plurality of second row extension traces 916, each second row extension trace 916 extending perpendicularly in the x-axis (parallel to the central row trace 912) from one of first extension row traces 914. In this manner, rectilinear electrode pattern 900 can be described as having interdigitated row traces 902 and column traces 904, as illustrated in FIG. 9.

Rectilinear pattern 900 shown in FIG. 9 can be considered as a 2×2 pixel pattern in accordance with some embodiments. Each pixel can be defined as having a center 920 located at an intersection (i.e. where column and row overlap) and extend in half-way between each adjacent intersection. The electrode pattern illustrated in FIG. 9 can define four pixel areas, defined by four rectangular-shaped pixels of equal size. FIG. 9 illustrates only four pixels for ease of understanding, but it is understood that many more pixels can added as needed by repeating pixel patterns in the x dimension, y dimension, or both dimensions.

The embodiment illustrated in FIG. 9 has five column extensions 908 between each intersection 920 along center column 906, but more or fewer column extensions 908 can be used in other embodiments. Furthermore, FIG. 9 illustrates one first row extension 912 between each intersection 920, and each first row extension 914 having two second row extensions 916 extending therefrom; however, more or fewer first and/or second row extensions, 914 and 916 respectively, can be used in other embodiments.

The below describes exemplary dimensions of pattern 900 in accordance with some embodiments. Row and column traces 902 and 904, respectively, can be in the range of 100 to 200 microns in width (reference A in FIG. 9) and, in some embodiments, can be 150 microns. Gaps B between adjacent vertical row traces 914 in the y-dimension can be in the range of 100 to 300 microns and, in some embodiments, can be 200 microns. Layer to layer gaps C between adjacent row trace 916 and column trace 908 in the y-dimension can be 50 to 550 microns, and in some embodiments, is 200 microns. Layer to layer Gaps D between adjacent central column 904 and row extension 916 in the x-dimension can be 50 to 550 microns, and in some embodiments, is 200 microns. Gaps E between adjacent column extension traces 908 can be 500 microns. Each pixel can have a height F of about 5000 microns and a width G of about 5000 microns.

In accordance with some embodiments, row traces 902 and column traces 904 of pattern 900 can be constructed so that a significant portion of the capacitance between row traces 902 and column traces 904 can be between non-overlapping portions of the electrodes (traces). These embodiments can have a better ratio of Csig to ΔCsig, which can lead to better performance, because thermal drift errors related to a sensing circuit, that scale with ΔCsig, can be less with Csig. A reason for this can be because the overlap areas are reduced or minimized.

Another advantage of pattern 900 can be that, because the traces are mostly horizontal, the pattern 900 can tolerate large X mismatch between the two layers (row and column traces) and still have consistent or uniform Csig. In addition, Y gaps (such as gap C in FIG. 9) between the traces can be large enough so that Y mismatch between layers can still produce an acceptably small variation in Csig.

Another advantage of pattern 900 can be that as a finger, for example, is moved across the surface of a sensor panel implementing pattern 900, the distance versus response ratio can be continuous or nearly continuous.

The pattern can also be easily adjusted for more or less Csig and ΔCsig. For example, by changing the tracewidths of the traces and their spacing, different Csig's and ΔCsigs can be obtained. In some embodiments, to achieve optimum results (e.g. large ΔCsig and a small Csig), the tracewidth can be minimized, and gap C, in FIG. 9 can be made approximately equal to the thickness of the dielectric label that covers the electrodes and separates it from the finger.

Figure 10:
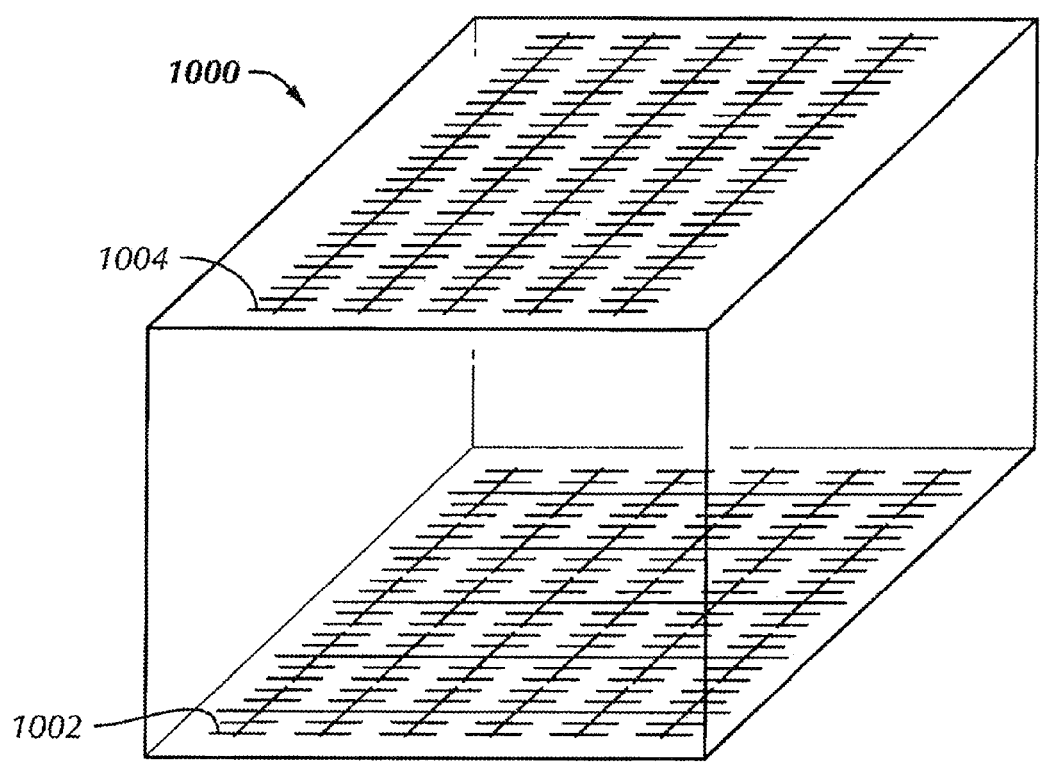
FIG. 10 is a perspective view of an exemplary DITO substrate (with its thickness greatly exaggerated for purposes of illustration only) illustrating the rectilinear trace pattern according to some embodiments of this invention.

FIG. 10 is a perspective view of an exemplary DITO substrate 1000 (with its thickness greatly exaggerated for purposes of illustration only) with rows 1002 and columns 1004 on either side forming a rectilinear pattern, like rectilinear pattern 900. It should be noted that use of rectilinear pattern is not limited to a DITO substrate, but can also be used in other embodiments. For example, rectilinear patterns in accordance with some embodiments can be used in sensor panels using multiple layers, such as described with reference to FIG. 3.

Figure 11A:
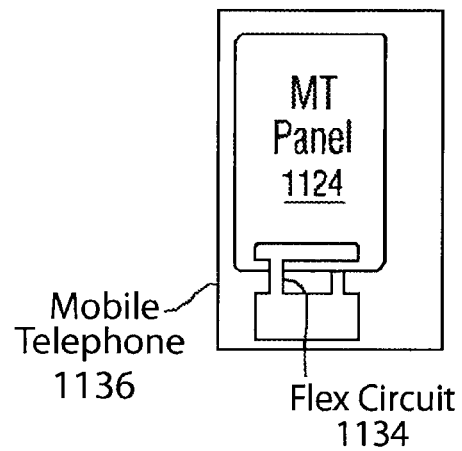
FIG. 11a illustrates an exemplary mobile telephone that can include the capacitive touch sensor panel and a flex circuit capable of connecting to both sides of the substrate according to some embodiments of this invention.
Figure 11B:
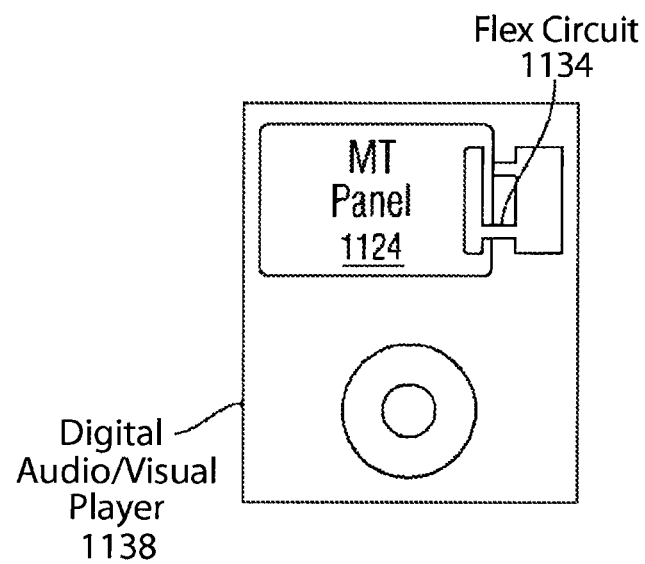
FIG. 11b illustrates an exemplary digital audio player that can include the capacitive touch sensor panel and a flex circuit capable of connecting to both sides of the substrate according to some embodiments of this invention.

FIG. 11*a* illustrates an exemplary mobile telephone 1136 that can include capacitive touch sensor panel 1124 and flex circuit 1134 capable of connecting to both sides of the substrate according to embodiments of this invention. Sensor panel 1124 can be fabricated using a substrate having column and row ITO traces formed on either side of the substrate, using pattern 900 for example, and metal traces form along the edges of one side of the substrate to allow flex circuit connection areas to be located on opposing sides of the same edge of the substrate. FIG. 11*b* illustrates an exemplary digital audio/video player 1138 that can include capacitive touch sensor panel 1124 and flex circuit 1134 capable of connecting to both sides of the substrate according to embodiments of this invention. Sensor panel 1124 can be fabricated using a substrate having column and row ITO traces formed on either side of the substrate, using pattern 900 for example, and metal traces form along the edges of one side of the substrate to allow flex circuit connection areas to be located on opposing sides of the same edge of the substrate.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A capacitive touch sensor panel, comprising:
a first plurality of traces of conductive material located on a first substrate, each of the first plurality of traces comprising a first central trace arranged along a first dimension of a two-dimensional coordinate system and a plurality of first trace branches at least one of plurality of first trace branches protruding from both sides of the first central trace in a substantially straight line, the plurality of first trace branches extending substantially perpendicularly from the first central trace in a second dimension of the two-dimensional coordinate system; and
a second plurality of traces of the conductive material located on a second substrate, each of the second plurality of traces comprising a second central trace arranged substantially along the second dimension and a plurality of second trace branches extending from the second central trace, at least some of the plurality of second trace branches comprising first extension branches, at least one of the first extension branches protruding from both sides of the second central trace in a substantially straight line, the first extension branches extending substantially perpendicularly along the first dimension from one of the second central traces and a plurality of second extension branches extending substantially perpendicularly along the second dimension from each of the first extension branches, the plurality of second extension branches interdigitated with the plurality of first trace branches.

2. The capacitive touch sensor panel of claim 1, wherein the first plurality of traces form sense traces and the second plurality of traces form drive traces.

3. The capacitive touch sensor panel of claim 2, wherein the first central and the second central trace overlap at substantially perpendicular angles.

4. The capacitive touch sensor panel of claim 1, further comprising a computing system that incorporates the sensor panel.

5. The capacitive touch sensor panel of claim 4, further comprising a mobile telephone that incorporates the computing system.

6. The capacitive touch sensor panel of claim 4, further comprising a digital audio player that incorporates the computing system.

7. A capacitive touch sensor panel, comprising:
sense traces formed on a first dielectric substrate, each of the sense traces comprising a central sense trace arranged substantially along a first dimension of a two-dimensional coordinate system and a plurality of extension sense traces, at least one of the plurality of extension sense traces protruding from both sides of the central sense trace in a substantially straight line, the plurality of extension sense traces extending substantially perpendicularly from the central sense trace substantially along a second dimension of the two-dimensional coordinate system; and drive traces formed on a second dielectric substrate, each drive trace comprising a central drive trace arranged substantially along the second dimension and a plurality of extension drive traces, wherein at least some of the plurality of extension drive traces include a first section extending substantially perpendicularly to and protruding from both sides of the central drive trace in a substantially straight line, the extension drive traces extending substantially arranged along the first dimension, and a plurality of second sections extending substantially perpendicularly along the second dimension from each of the first sections, the plurality of second sections interdigitated with the plurality of extension sense traces.

8. The capacitive touch sensor panel of claim 7, wherein the central sense trace and the central drive trace overlap at substantially perpendicular angles.

9. The capacitive touch sensor panel of claim 7, wherein the central sense traces and the central drive traces form a plurality of continuous or substantially continuous pixels.

10. The capacitive touch sensor panel of claim 9, wherein the center of each of the plurality of pixels is where the central sense traces and the central drive traces overlap.

11. A mobile telephone having a capacitive touch sensor panel, the touch sensor panel comprising:
a first plurality of traces of conductive material located on a first substrate, each of the first plurality of traces comprising a first central trace arranged substantially along a first dimension of a two-dimensional coordinate system and a plurality of first trace branches, at least one of the plurality of first trace branches protruding from both sides of the first central trace in a substantially straight line, the plurality of first trace branches extending substantially perpendicularly from the first central trace in a second dimension of the two-dimensional coordinate system; and
a second plurality of traces of the conductive material located on a second substrate, each of the second plurality of traces comprising a second central trace arranged substantially along the second dimension and a plurality of second trace branches extending from the second central trace, at least some of the plurality of second trace branches comprising first extension branches protruding from both sides of the second central trace in a substantially straight line, the first extension branches extending substantially perpendicularly along the first dimension from one of the second central traces and a plurality of second extension branches extending substantially perpendicularly along the second dimension from each of the first extension branches, the plurality of second extension branches interdigitated with the plurality of first trace branches.

12. A digital audio player having a capacitive touch sensor panel, the touch sensor panel comprising:
a first plurality of traces of conductive material located on a first substrate, each of the first plurality of traces comprising a first central trace arranged substantially along a first dimension of a two-dimensional coordinate system and a plurality of first trace branches, at least one of the plurality of first trace branches protruding from both sides of the first central trace in a substantially straight line, the plurality of first trace branches extending substantially perpendicularly from the first central trace in a second dimension of the two-dimensional coordinate system; and
a second plurality of traces of the conductive material located on a second substrate, each of the second plurality of traces comprising a second central trace arranged substantially along the second dimension and a plurality of second trace branches extending from the second central trace, at least some of the plurality of second trace branches comprising first extension branches protruding from both sides of the second central trace in a substantially straight line, the first extension branches extending substantially perpendicularly along the first dimension from one of the second central traces and a plurality of second extension branches extending substantially perpendicularly along the second dimension from each of the first extension branches, the plurality of second extension branches interdigitated with the plurality of first trace branches.

13. A capacitive touch sensor panel, comprising:
a first plurality of traces of conductive material located on a first substrate, each of the first plurality of traces comprising a first central trace arranged substantially along a first dimension of a two-dimensional coordinate system and a plurality of first trace branches, at least one of the plurality of first trace branches protruding from both sides of the first central trace in a substantially straight line, the plurality of first trace branches extending substantially perpendicularly from the first central trace in a second dimension of the two-dimensional coordinate system; and
a second plurality of traces of the conductive material located on a second substrate, each of the second plurality of traces comprising a second central trace arranged substantially along the second dimension and a plurality of second trace branches, at least one of the plurality of second trace branches extending substantially perpendicularly to the second central trace and protruding from both sides of the second central trace in a substantially straight line , and a plurality of extension branches extending substantially perpendicularly along the second dimension from each of the second trace branches the plurality of extension branches interdigitated with the plurality of first trace branches.

14. A capacitive touch sensor panel, comprising:
a first plurality of traces of conductive material located on a first substrate, each of the first plurality of traces comprising a first central trace arranged along a first dimension of a two-dimensional coordinate system and a plurality of first trace branches, at least one of the plurality of first trace branches protruding from both sides of the first central trace in a substantially straight line, the plurality of first trace branches extending substantially perpendicularly from the first central trace in a second dimension of the two-dimensional coordinate system; and
a second plurality of traces of the conductive material located on a second substrate, each of the second plurality of traces comprising a second central trace arranged substantially along the second dimension and a plurality of second trace branches, at least one of the plurality of second trace branches extending substantially perpendicularly to the second central trace and protruding from both sides of the second central trace in a substantially straight line and disposed at a substantially equal distance on each side of the first central trace, and a plurality of extension branches extending substantially perpendicularly along the second dimension from each of the second trace branches the plurality of extension branches interdigitated with the plurality of first trace branches.

15. The capacitive touch sensor panel as recited in claim 14, wherein the distance along the first direction between a given first trace branch and a given extension branch is the same as the distance along the second dimension between a given first central trace and a given extension branch.

16. A capacitive touch sensor panel, comprising:
a first plurality of traces of conductive material located on a first substrate, each of the first plurality of traces comprising a first central trace arranged substantially along a first dimension of a two-dimensional coordinate system and a plurality of first trace branches, at least one of the plurality of first trace branches protruding from both sides of the first central trace in a substantially straight line, the plurality of first trace branches extending substantially perpendicularly from the first central trace in a second dimension of the two-dimensional coordinate system; and
a second plurality of traces of the conductive material located on a second substrate, each of the second plurality of traces comprising a second central trace arranged substantially along the second dimension and a plurality of second trace branches, at least one of the plurality of second trace branches extending substantially perpendicularly to the second central trace and protruding from both sides of the second central trace in a substantially straight line, and a plurality of extension branches extending substantially perpendicularly along the second dimension from each of the second trace branches, the plurality of extension branches interdigitated with the plurality of first trace branches, and each extension branch being substantially equal distance along the first dimension between adjacent first trace branches.

17. The capacitive touch sensor panel as recited in claim 16, wherein the distance along the first dimension between a given first trace branch and a given extension branch is the same as the distance along the second dimension between a given first central trace and a given extension branch.

18. A capacitive touch sensor panel, comprising:
sense traces formed on a first dielectric substrate, each of the sense traces comprising a central sense trace arranged substantially along a first dimension of a two-dimensional coordinate system and a plurality of extension sense traces, at least one of the plurality of extension traces extending substantially perpendicularly from the central sense trace along a second dimension of the two-dimensional coordinate system; and
drive traces formed on a second dielectric substrate, each drive trace comprising a central drive trace arranged substantially along the second dimension and a plurality of extension drive traces, wherein at least some of the plurality of extension drive traces include a first section arranged substantially along the first dimension, and a plurality of second sections extending substantially perpendicularly along the second dimension from each of the first sections, the plurality of second sections interdigitated with the plurality of extension sense traces; and
wherein:
a center of a touch pixel is defined at the crossover of a central sense trace with a central drive trace; and
the first section of the at least some of the plurality of extension drive traces are disposed substantially midway along the second dimension between the centers of two adjacent touch pixels.

19. The capacitive touch sensor panel as recited in claim 18, wherein:
the plurality of extension sense traces extend across the central sense trace in a substantially straight line; and
the first section extends substantially perpendicularly across the central drive trace in a substantially straight line.

20. A capacitive touch sensor panel, comprising:
a first plurality of traces of conductive material located on a first substrate, each of the first plurality of traces comprising a first central trace arranged substantially along a first dimension of a two-dimensional coordinate system and a plurality of first trace branches, at least one of the plurality of extension traces extending substantially perpendicularly from the first central trace in a second dimension of the two-dimensional coordinate system; and
a second plurality of traces of the conductive material located on a second substrate, each of the second plurality of traces comprising a second central trace arranged substantially along the second dimension and a plurality of second trace branches extending from the second central trace, at least some of the plurality of second trace branches comprising first extension branches extending substantially perpendicularly along the first dimension from one of the second central traces and a plurality of second extension branches extending substantially perpendicularly along the second dimension from each of the first extension branches, the plurality of second extension branches interdigitated with the plurality of first trace branches,
wherein:
a center of a touch pixel is defined at the crossover of a first central trace with a second central trace; and
at least some of the second trace branches are disposed substantially midway along the second dimension between the centers of two adjacent touch pixels.

21. A capacitive touch sensor panel as recited in claim 20, wherein:
at lease a three first trace branches are disposed along the first dimension between the centers of at least some adjacent touch pixels.

22. The capacitive touch sensor panel as recited in claim 21, wherein five first trace branches are disposed along the first dimension between the centers of at least some adjacent touch pixels.

* * * * *